3,418,586
DIGITAL PULSE TRAIN DETECTION SYSTEM
Ralph L. Asher, Hackensack, N.J., assignor to International Telephone and Telegraph Corporation, Nutley, N.J., a corporation of Delaware
Filed Sept. 8, 1965, Ser. No. 485,774
10 Claims. (Cl. 329—104)

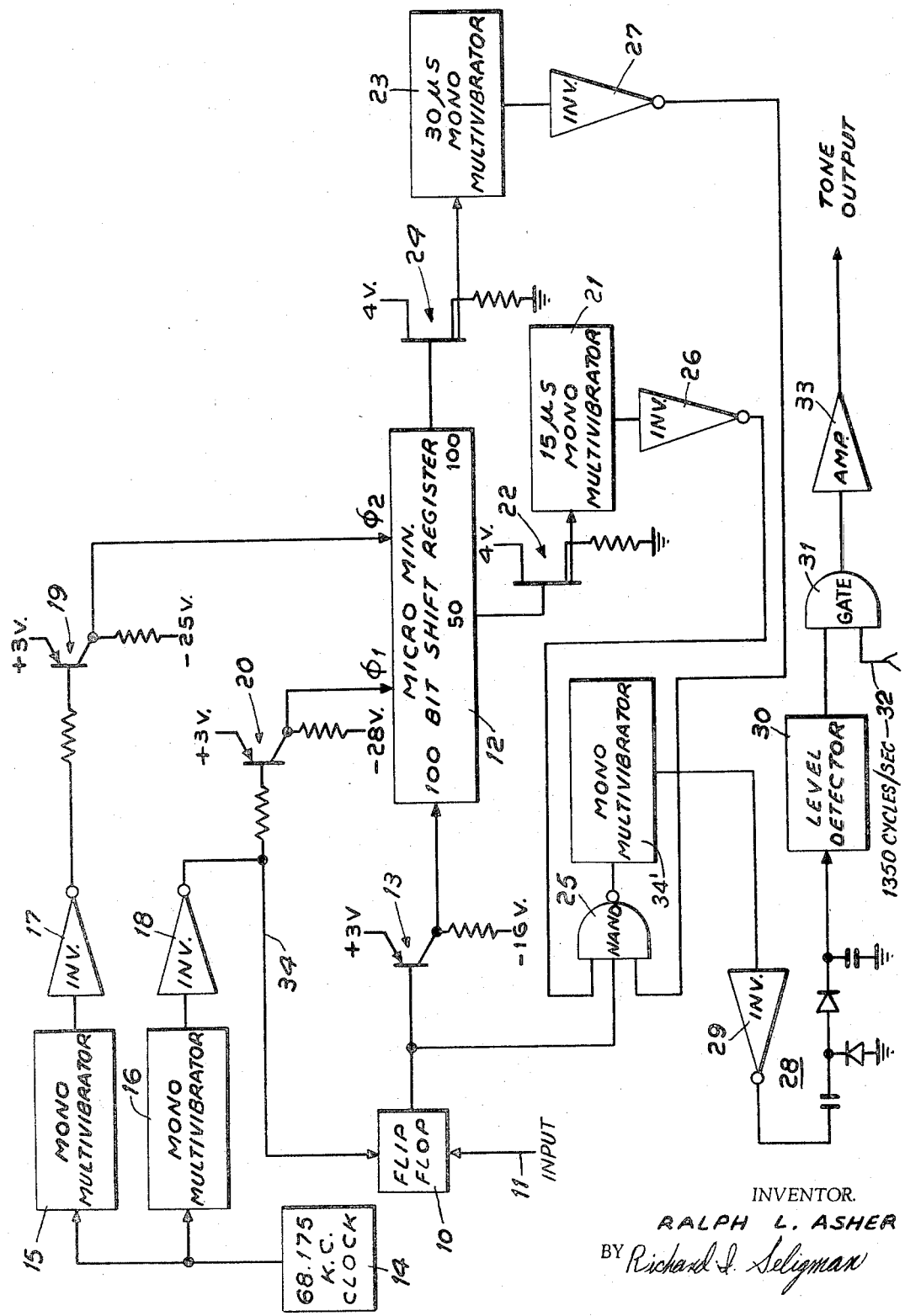
Dec. 24, 1968    R. L. ASHER    3,418,586
DIGITAL PULSE TRAIN DETECTION SYSTEM
Filed Sept. 8, 1965
INVENTOR.
RALPH L. ASHER
BY Richard L. Seligman
ATTORNEY

United States Patent Office 3,418,586
Patented Dec. 24, 1968

ABSTRACT OF THE DISCLOSURE

Pulses having a predetermined spacing in a pulse train which also includes random pulses are detected in a coincidence detecting arrangement. The train is applied to a shift register via a flip-flop and circulated. The shift register and the flip-flop are driven by an oscillator clock. Two output taps on the shift register are separately coupled to a NAND circuit, which has an input from the flip-flop to determine coincidence. The NAND circuit output is coupled to a gate, which receives a 1350 cycle per second signal, to provide a tone indicating receipt of the desired signal.

---

This invention relates to apparatus for detecting a train of pulses in which the pulses have a predetermined spacing and more particularly to the extraction of a regular pulse train from a pulse signal including random pulses.

In many systems it is necessary to identify a regular pulse train. One particularly important application occurs in radio navigation systems where signals from more than a single beacon is received, and it becomes a requisite that a receiver be aware as to which beacon is transmitting the received information; for example, in the radio navigation system commonly known as Tacan each surface beacon is identified by an assigned letter-number group. The signal from which the group is formed consists of pulse pairs with twelve microsecond spacing between the individual pulses of the pair transmitted as double pairs, with the double pairs being decoded as single pulses at a 1350 cycle repetition rate at the receiver. At present in the Tacan system the identity tone pulses, after decoding, are applied to ring a resonant circuit tuned to the 1350 repetition frequency. Although this method of identity tone recognition provides more than marginal performance it is encumbered by all the drawbacks associated with analog techniques, especially those relevant to tuned circuits. Because of the limited Q obtainable in iron core components at 1350 c.p.s., sensitivity is not as good as would be desired; also, reliability is not as good as could be since the components tend to drift with temperature variations. Furthermore, there is usually always present a slight background noise in the earphones when there is no tone being transmitted.

Since the identity tone occurs at a regular 1350 cycle per second rate its basic pulse spacing of 740 microseconds could be detected through a conventional delay line type detector. However, the use of a delay line of 740 microseconds or more in an airborne equipment is impractical due to limitations of size and weight.

Accordingly, it is an object of this invention to provide an improved identity tone detection arrangement particularly one using digital techniques.

Another object of this invention is to provide identity tone detection circuitry which has a designed-in and precise tolerance.

In accordance with one aspect of the present invention there is provided apparatus for detecting a pulse train in which successive pulses have a predetermined spacing, including a shift register to which the received pulse train is applied, means to circulate the pulse train through the shift register, and a coincident gate coupled to the input to the shift register and to preselected outputs thereof.

In accordance with another aspect of the invention, apparatus for detecting a pulse train in which successive pulses have a predetermined spacing is provided. The apparatus includes means to receive the pulse train, and delay means having an input and a plurality of outputs to delay the received pulses of the pulse train an amount of time which is slightly less than that which would provide a coincident arrival of pulses at the input and outputs of the delay means when a pulse train is received having successive pulses separated by the predetermined spacing; that is, a pulse train having the parameters to which the equipment is designed to detect. Also included are a plurality of delay apparatus coupled to each of the outputs of the delay means to delay signals appearing at those outputs for unequal lengths of time.

The above mentioned and other features and objects of this invention will become more apparent by reference to the following description taken in conjunction with the accompanying drawing which is a block diagram illustrating a preferred embodiment of the invention. In the hereinafter described embodiment of the present invention I prefer to employ a shift register as a quantized delay element. A two phase clock is used to drive the shift register. Outputs are taken at selected bits of the shift register such that their electrical spacing will provide signal coincidence at all outputs and at the input to the shift register when the desired identity tone is received. Thus, outputs from this decoder will be achieved only when a valid Tacan tone signal is received, noise and random signals being rejected with great certainty. Coincidence between outputs and a signal at the input is recognized by a logical NAND element.

A feture of this invention provides that a valid decoded output is obtained even though the regular fixed tone identity signal varies a predetermined fixed percentage from the nominal frequency. This feature is obtained therein by selecting the clock frequency to be higher than that frequency which would cause pulses to arrive at the outputs of the shift register simultaneously, and further includes extending the duration of the shift register outputs to have time durations to not only compensate for the advanced clock but also to provide additional tolerance for tone identity signal variations.

The figure illustrates a practical embodiment employing the invention, comprising a flip-flop 10 to which the decoded video signal 11 is applied. The output from flip-flop 10 is coupled to a shift register 12 via a transistor circuit 13. Transistor circuit 13 is utilized to convert the logic levels from DTL (diode transistor logic) having values of about 0 and +3 volts to the negative signals required at the input of one type of shift register 12, which are of the order of —3 and —20 volts. In the preferred embodiment shift register 12 is a 100 bit metal oxide semiconductor shift register which has extremely small dimensions and thus is uniquely adaptable for airborne application. The preferred shift register could be replaced by discrete digital delay elements.

A two phase clock 14 is employed to drive shift register 12. Of course, if a different shift register is used a single phase clock might suffice; the two phase clock being required since intermediate storage is employed in the preferred shift register described above. The clock is obtained from a crystal controlled oscillator running at 68.175 kc. The output from clock 14 is applied to two monostable multivibrators 15 and 16, the outputs of which are then fed to shift register 12 via inverters 17 and 18 and transistor level converting circuits 19 and 20. The multivibrators 15 and 16 are triggered by the crystal oscillator output and its complement. The output of the 50th bit of shift register 12 is applied to a monostable multivibrator 21 via a field effect transistor circiut 22 which converts the levels from the shift register back to DTL logic levels. Monostable multivibrator 21 has a duration of 15 microseconds. Likewise the output of the 100th bit of shift register 12 is applied to another monostable multivibrator 23 via a field effect transistor circuit 24. Monostable multivibrator 23 has a duration twice that of monostable multivibrator 21, or 30 microseconds. The outputs from monostable multivibrators 21 and 23 are applied to a NAND gate 25 via inverters 26 and 27. The input to shift register 12 is also fed to NAND gate 25. The output of NAND gate 25 triggers a one shot multivibrator 34', the output from which is fed to an integrator 28 via inverter 29. A level detector 30 is employed to detect the output of integrator 28. Level detector 30 is a threshold sensing device. The output from level detector 30 is applied to an input of a gate 31, the other input to gate 31 is a 1350 cycle signal 32. The output of gate 31 is amplified at 33.

The circuit described above has a built in tolerance of plus and minus 1 percent. The decoded video signal 11 which includes the decoded 1350 cycle identity tone signal containing pulses spaced at 740 microseconds is the input to the Tacan identity tone decoder circuit. Each time a decoded signal is applied to the identity circuit, flip-flop 10 is triggered. It is reset by phase 1 of clock 14 along line 34. The input from flip-flop 10 shifts down register 12 arriving at the 50th bit position approximately 740 microseconds later. The exact time of arrival at this bit is $\frac{1}{68,175} \times 50 = 732.6$ microseconds which is equal to 740 microseconds $-1$ percent. Monostable multivibrator 21 is triggered by the arrival of these pulses at bit 50 of the register and lasts 15 microseconds, or a sufficient length of time to strech the decoding output from $-1$ percent to $+1$ percent. The received video signal also appears at the 100th bit or register 12 but this time it is detected 1480 microseconds minus 1 percent. In a similar manner to that described for the 50th bit, a 30 microsecond multivibrator is triggered producing the required plus and minus 1 percent tolerance at this position. If the received signal consists of 3 or more pulses spaced 740 microseconds $\pm 1$ percent NAND gate 25 will become enabled. The output of NAND gate 25 triggers monostable multivibrator 45', the function of which is to insure uniform width pulses. The signal is integrated at integrator 28, the output from which is monitored by level detector 30. The output from level detector 30 gates a 1350 cycle digital signal which is amplified and appears as the tone output of the decoder.

What I have described above the principles of my invention in connection with specific apparatus, it is to be clearly understood that the specification is presented by way of example and not as a limitation of the scope of my invention, as set forth in the accompanying claims.

I claim:
1. Apparatus for detecting a pulse train in which successive pulses have a predetermined spacing, comprising:
   a first means to receive the pulse train;
   a shift register having an input and a plurality of preselected outputs;
   second means to apply the received pulse train to said shift register;
   third means including a clock for circulating the pulse train through said shift register at a rate such that coincident arrival of pulses at the input and outputs of said shift register will occur whenever a pulse train having pulses separated by said predetermined spacing is received, and;
   a coincident gate coupled to the input and outputs of said shift register.

2. Apparatus as in claim 1 and further including at least one delay means coupled between each shift register output and said coincident gate.

3. Apparatus as in claim 2 wherein third means includes a clock for circulating the pulse train through said shift register at a rate slightly greater than that which would provide coincident arrival of pulses at the input and outputs of said shift register when a pulse train is received having pulses separated by said predetermined spacing.

4. Apparatus as in claim 3 in which said second means includes asynchronous to synchronous circuitry for synchronizing the pulse train to said clock.

5. Apparatus as in claim 4 in which said delay means coupled between said shift register outputs and said coincident gate are of unequal delay time.

6. Apparatus as in claim 3 in which said clock is a two phase clock and includes an oscillator, a pair of monostable multivibraors triggered by the rise and fall of the output from said osillator, and circuitry for converting the outputs of said multivibrators to proper values required to drive said shift register.

7. Apparatus as in claim 5 in which said delay means includes monostable multivibrators each having different delay times.

8. Apparatus for identifying a beacon wherein the transmitted identity tone signal is comprised of a pulse train of paired pulses occurring periodically, which pairs upon being received are initially decoded to single pulses, comprising:
   a shift register having two outputs, one of which is taken at half the bits of the other;
   a two phase clock for driving said shift register, said clock having a frequency such that the pulses of the received identity tone pulse train will appear at the outputs of said shift register earlier than the time which would produce a coincident of pulses appearing at the input and two outputs to said shift register;
   means to synchronize the decoded pulse train to said clock;
   a coincident gate coupled to the input and two outputs of said shift register;
   a delay network having a finite delay time coupled between the first output of said shift register and said coincident gate;
   a second delay network having a finite delay time coupled between a second output of said shift register and said coincident gate; and
   an integrator coupled to said coincident gate.

9. Apparatus as in claim 8 in which the delay time of said second delay network is approximately twice that of said first delay network.

10. Apparatus as in claim 9 and further including a level detector coupled to said integrator, a gate having as one input the output from said level detector, and an audio signal source coupled to said gate as a second input thereto.

References Cited

UNITED STATES PATENTS

| | | | |
|---|---|---|---|
| 2,752,507 | 6/1956 | Dureau | 329—104 X |
| 2,977,543 | 3/1961 | Lutz et al. | 328—110 |
| 3,108,228 | 10/1963 | Clapper | 307—88.5 |
| 3,343,169 | 9/1967 | Maine | 328—55 X |

ALFRED L. BRODY, *Primary Examiner.*

U.S. Cl. X.R.

329—107; 332—11; 328—109, 37, 55; 307—221, 232, 271; 325—321; 343—101